United States Patent [19]

Sandor

[11] Patent Number: 5,340,972
[45] Date of Patent: Aug. 23, 1994

[54] HANDS-FREE BAR CODE SCANNER WITH FINGER ACTIVATED OPTICAL CONTROL

[75] Inventor: Joseph Sandor, Balboa Island, Calif.

[73] Assignee: Symbol Technologies, Inc., Bohemia, N.Y.

[21] Appl. No.: 862,698

[22] Filed: Apr. 3, 1992

Related U.S. Application Data

[63] Continuation-in-part of Ser. No. 699,417, May 13, 1991, Pat. No. 5,191,197.

[51] Int. Cl.$^5$ .............................................. G06K 7/10
[52] U.S. Cl. .................................... 235/472; 235/462; 250/221
[58] Field of Search ...................... 250/221; 341/20, 21; 200/DIG. 2; 235/462, 472

[56] References Cited

U.S. PATENT DOCUMENTS

| | | | |
|---|---|---|---|
| 1,173,269 | 2/1916 | Heidemann | 200/DIG. 2 |
| 1,325,885 | 12/1919 | Weber | 200/DIG. 2 |
| 1,335,272 | 3/1920 | Broughton | 200/DIG. 2 |
| 1,484,712 | 2/1924 | Johnson | 200/DIG. 2 |
| 4,251,798 | 2/1981 | Swartz | 235/472 |
| 4,340,813 | 7/1982 | Sauer | 250/221 |
| 4,369,361 | 1/1983 | Swartz et al. | 235/470 |
| 4,418,277 | 11/1983 | Tremmel et al. | 235/472 |
| 4,496,831 | 1/1985 | Swartz et al. | 235/472 |
| 4,570,057 | 2/1986 | Chadima, Jr. et al. | 235/472 |
| 4,603,262 | 7/1986 | Eastman | 235/472 |
| 4,628,193 | 12/1986 | Blum | 235/472 |
| 4,727,245 | 2/1988 | Dobbins et al. | 235/472 |
| 4,758,717 | 7/1988 | Shepard | 235/472 |
| 4,760,248 | 7/1988 | Swartz et al. | 235/472 |
| 4,766,299 | 8/1988 | Tierney et al. | 235/472 |
| 4,850,009 | 7/1989 | Zook et al. | 379/96 |
| 5,029,183 | 7/1991 | Tymes | 375/1 |
| 5,138,141 | 8/1992 | Blanford et al. | 250/221 |
| 5,179,256 | 1/1993 | Haglund | 200/52 R |
| 5,212,372 | 5/1993 | Quick et al. | 235/472 |

Primary Examiner—John Shepperd

[57] ABSTRACT

A hands-free bar code scanner unit is mounted on the back of the hand or wrist of an operator to free the hands and arms of the operator to perform normal manual tasks. The bar code scanner is selectively actuated by the operator by positionally moving one or more fingers, preferably by pointing an index finger. The bar code scanner unit comprises a housing secured to the back of the hand or wrist of an operator. The housing mounts therein an active or passive photosensor for detecting a predetermined positional movement of one or more fingers by the operator. The housing also mounts therein a bar code scanner which scans in the direction in which the scanner is aimed, as in the direction of a pointing finger, and is responsive to the photosensor detecting a predetermined positional movement of one or more fingers to actuate the bar code scanner. In a preferred embodiment, a first photosensor detects the position of the index finger, and a second photosensor detects the position of the middle finger. During operation, a logic circuit is coupled to the outputs of the first and second photosensors to actuate the bar code scanner when the outputs of the photosensors indicate relaxed nonpointing positions of both the index finger and the middle finger followed by a pointing position of the index finger and a relaxed nonpointing position of the middle finger. The arrangement and logic circuit provide for ambidextrous placement of the unit on either the right or the left hand of an operator.

38 Claims, 7 Drawing Sheets

HANDS-FREE BAR CODE SCANNER WITH FINGER ACTIVATED OPTICAL CONTROL

This patent application is a continuation-in-part application of Ser. No. 699,417, filed May 13, 1991, now U.S. Pat. No. 5,191,197, for Mirrorless Scanners with Movable Laser, Optical and Sensor Components.

BACKGROUND OF THE INVENTION

1. Field of the Invention

The present invention relates generally to a hands-free bar code scanner, and more particularly pertains to a bar code scanner unit which is mounted on the back of the wrist or hand of an operator in such a manner as to free the operator's hands and arms to perform normal manual tasks. The bar code scanner is selectively actuated by the operator by positionally moving one or more fingers, preferably by pointing with the index finger at a bar code pattern to be scanned. The hands-free bar code scanner provides the ability to scan and read bar codes without detracting from the functionality of the operator's hands and arms. With a hands-free bar code scanner as taught by the present invention, the operator does not have to intermittently grasp and point a hand-held bar scanner, and then release it and place it aside, as in a belt supported holster, which sequence of steps is then repeated for subsequent scanning operations.

2. Discussion of the Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, with the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been commonly assigned to the same assignee as the present application.

As disclosed in some of the above patents, one embodiment of such a scanning system resides, inter alia, in a portable laser scanner which is grasped and hand-held by a user, which is designed to allow the user to aim the scanner, and more particularly a light beam emanating therefrom, at a target bar code symbol to be read.

One problem associated with this type of hand-held, manually grasped portable scanner is that the operator is typically a worker, such as a warehouse or stockroom worker or a cash register operator, who is performing other manual tasks with his hands such as driving a lift truck, handling merchandise, picking warehouse parts, or handling and processing items being checked out at a register. In a typical operation, the operator intermittently grasps the hand-held scanner to scan bar codes on items, and then sets the scanner aside or in a strap supported holster to perform other manual tasks with his hands as described above, and then repeats this sequence of operations for other items being scanned.

In prior art bar code scanners, the light source in a laser scanner is typically a gas laser or semiconductor laser. The use of a semiconductor device such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spacers. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of this discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patters, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row individually. Likewise, the multiple-scan-line readers produce a number of scan lines at an angle to one another so these are not suitable for recognizing a Code 49 type of two-dimensional symbols.

In the scanning systems known in the prior art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected by the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters represented thereby.

The decoding process in known scanning systems usually works in the following manner. The decoder receives the pulse width modulated digital signal from the scanner, and an algorithm implemented in software attempts to decode the scan. If the start and stop characters and the characters between them in the scan are decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader incorporates detectors based upon charge coupled device (CCD) technology. In such readers, the size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

Accordingly, it is a primary object of the present invention to provide a hands-free bar code scanner.

A further object of the subject invention is the provision of a hands-free bar code scanner which is mounted on the back of the hand or wrist of an operator in such a manner as to free the hands and arms of the operator to perform normal manual tasks. The bar code scanner is selectively actuated by the operator by positionally moving one or more fingers, preferably by pointing his index finger at the bar code pattern to be scanned. The hands-free bar code scanner provides the ability to scan and read bar codes without detracting from the functionality of the operator's hands and arms. With such a point activated bar code scanner, the operator does not have to intermittently grasp and point a hand-held bar scanner, and then release it and place it aside, as in a holster, for subsequent scanning operations.

The present invention provides a hands-free bar code scanner which is mounted on the hand or wrist of an operator in such a manner as to free the hands of the operator to perform normal manual tasks. The hands-free bar code scanner allows the operator, with the unit attached to his hand or wrist, to perform other manual tasks with his hands such as driving a lift truck, handling merchandise, picking warehouse parts, or handling and processing items being checked out at a register.

In accordance with the teachings herein, the present invention provides a hands-free bar code scanner unit mounted on the hand or wrist of an operator, and a method of operation thereof by which a bar code scanner is actuated by a predetermined positional movement of one or more fingers by the operator while aiming the scanner at a bar code symbol to be detected. The unit comprises a housing secured to the back of the hand or wrist of an operator. The housing mounts therein a photosensor for detecting a predetermined positional movement of one or more fingers by the operator. The housing also mounts therein a bar code scanner which scans in the direction in which the scanner is aimed, and is responsive to the photosensor detecting a predetermined positional movement of one or more fingers to actuate the bar code scanner.

In greater detail, the photosensor detects a pointing position of the index finger, and the bar code scanner is mounted in the housing to be aimed in the direction of the pointing position of the index finger. The photosensor also detects a relaxed nonpointing position of the middle finger. In greater detail, during operation, a logic circuit is coupled to the photosensor to actuate the bar code scanner when the outputs of the photosensor indicate, first detecting relaxed nonpointing positions of both the index finger and the middle finger, followed by a pointing position of the index finger and a relaxed nonpointing position of the middle finger. The arrangement and logic circuit provide for ambidextrous placement of the unit on either the right hand or the left hand of an operator. The logic circuit enables the bar code scanner upon the pointing of the index finger of either the left or right hand of the operator on which the scanner is mounted and the simultaneous relaxed nonpointing of the middle finger of either the left or right hand of the operator on which the scanner is mounted.

The housing is contoured with recesses to fit the tops of the index and middle fingers of an operator, and a photosensor is provided for each recess for the index and middle fingers of an operator. Each photosensor comprises an active photosensor assembly which includes a radiation source for generating a radiation beam which can be interrupted by a moving finger, and a photodetector for detecting radiation of the radiation beam either reflected from a relaxed nonpointing finger, or blocked by a pointing finger.

The hands-free bar code scanner unit includes a mounting for securing the unit housing to the wrist or forearm of an operator. A rear portion of the mounting is wrapped around the wrist or forearm of an operator, and a forward portion of the mounting is secured to mounting frames underneath the housing. The rear portion of the mounting also includes a strap which encircles the wrist or forearm of an operator, which preferably includes a Velcro release. Moreover, an elastic band is also provided which encircles both the index and middle fingers of the hand of an operator.

BRIEF DESCRIPTION OF THE DRAWINGS

The foregoing objects and advantages of the present invention for a hands-free bar code scanner may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
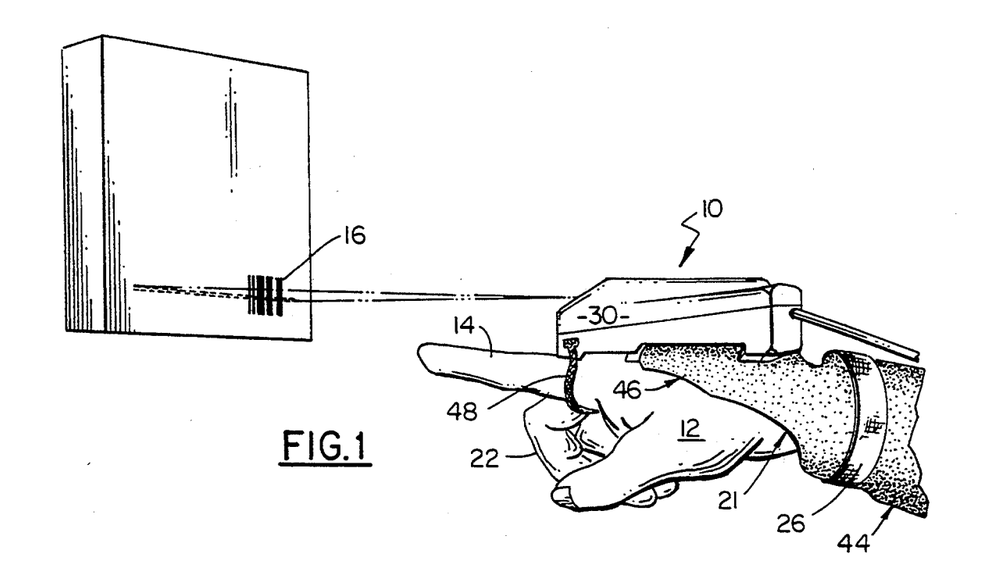
FIG. 1 is a perspective view of an exemplary embodiment of a hands-free bar code scanner unit pursuant to the teachings of the present invention which is mounted on the back of the hand of an operator, and is selectively operated by the operator by pointing his index finger at a bar code pattern to be scanned.
Figure 2:
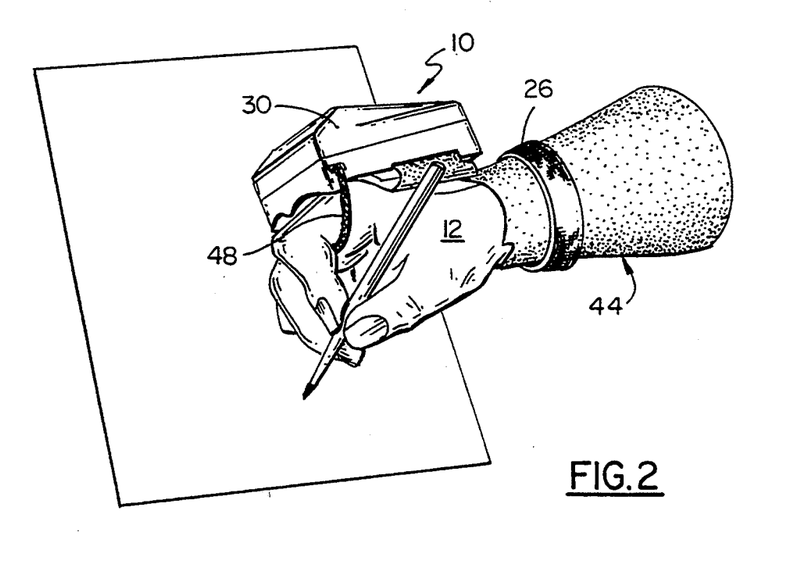
FIG. 2 is a perspective view of the unit of FIG. 1 while the operator is performing a manual task of writing, and illustrates the unencumbering nature of the hands-free bar code scanner.
Figure 3:
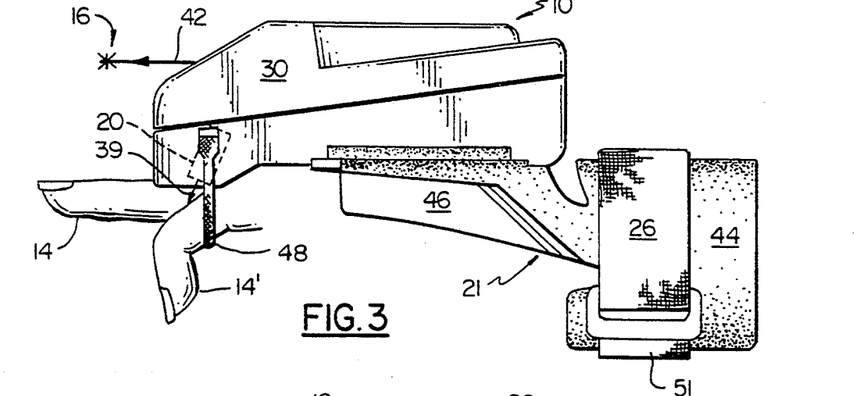
FIG. 3 illustrates a side perspective view of the hands-free bar code scanner unit of FIGS. 1 and 2, and illustrates the interaction of both a pointing finger and a nonpointing finger of an operator with a photosensor which detects the presence of the pointing finger.

FIGS. 1, 2 and 3 illustrate best the mode of operation of the present invention. FIG. 1 is a perspective view of an exemplary embodiment of a hands-free bar code scanner unit 10 pursuant to the teachings of the present invention which is mounted on the back of the hand 12 of an operator, and is selectively actuated by the operator by pointing his index finger 14 at a bar code pattern 16 to be scanned. The unit in its simplest form consists of a bar code scanner 18, FIG. 7, a finger positional moving sensing assembly 20 for triggering the bar code scanner, and a mounting 21 for securing the unit to an operator's hand or wrist.

The method of triggering the hands-free bar code scanner unit is critical in establishing the device as a practical and useful product. Inadvertent triggering of the scanner is undesirable for a variety of reasons (e.g. erroneous data entry, excessive depletion of battery power, confusion of the operator, etc.). On the other hand, aiming the unit such that its scanning beam scans a chosen bar code as soon as possible is desirable as it provides for a fast and accurate data entry rate, user confidence, and a minimum usage of battery power. An ideal method of triggering comprises detecting a simple but deliberate positional movement which provides for aiming as well as reliably triggering the bar code scanner.

A preferred triggering positional movement is pointing (in a typical pointing motion, the index finger 14 is extended, and the middle finger 22 is retracted). This specific combination of positional movements is detected by the sensing assembly 20 which triggers the scanner. A preferred pointing triggering motion properly aims and points the scanner, and also triggers operation of the scanner in a manner which minimizes inadvertent triggering.

However, in some embodiments, a triggering motion could also be utilized which is entirely separate from the act of aiming the scanner. For instance, the scanner could be aimed in a direction 24, FIG. 4, perpendicular to the lengthwise direction of an operator's hand and wrist, and the triggering positional movement could be an intermittent waving of the index finger, in which case the aiming operation is completely separate from the triggering motion.

Figure 4:
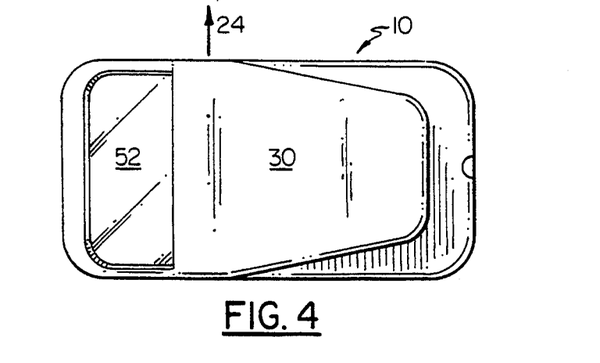
FIG. 4 illustrates a top plan view of the hands-free bar code scanner unit of FIGS. 1–3.
Figure 5:
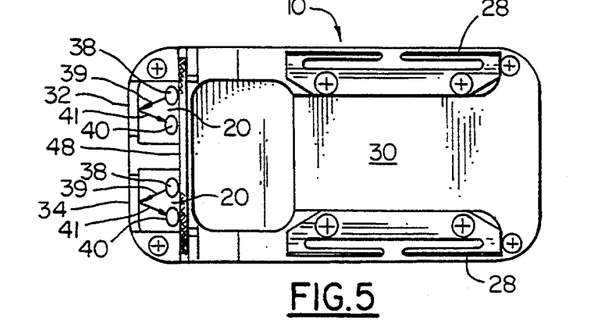
FIG. 5 is a bottom plan view of the hands-free bar code scanner unit of FIGS. 1–4.
Figure 6:
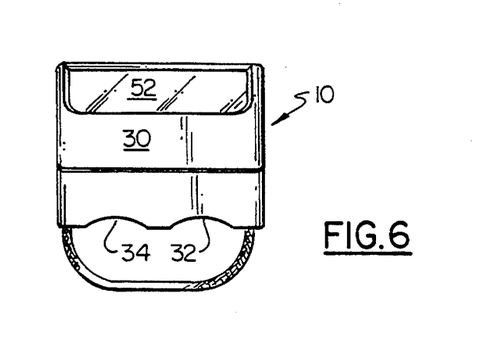
FIG. 6 illustrates a left elevational view of the hands-free bar code scanner unit of FIGS. 1–5.
Figure 7:
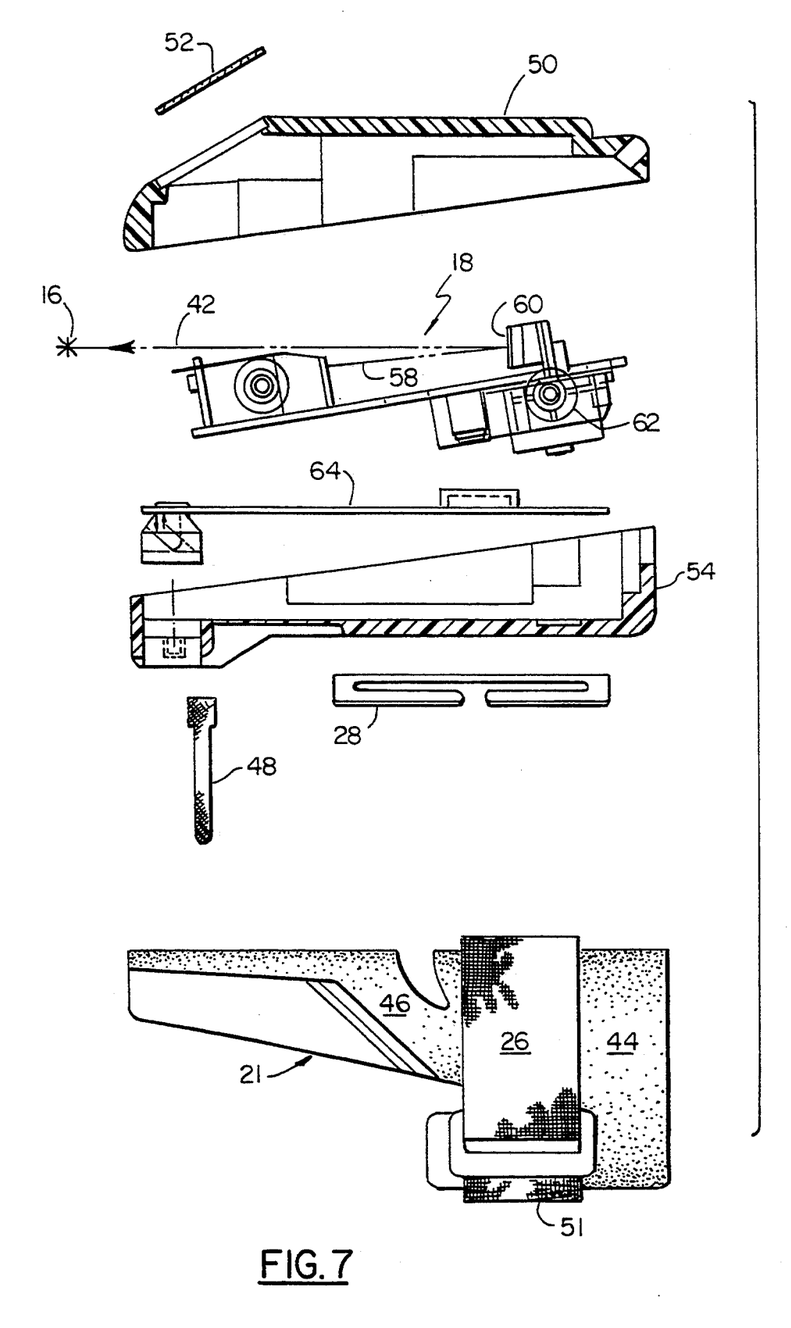
FIG. 7 illustrates an exploded assembly drawing of one designed embodiment of the housing and bar code scanner unit.

FIG. 2 is a perspective view of the unit of FIG. 1 while the operator is performing a manual task of writing, and illustrates the unencumbering nature of the hands-free bar code scanner. FIG. 3 illustrates a side perspective view of the hands-free bar code scanner of FIGS. 1 and 2 with the mountings therefor, and illustrates, along with FIG. 5, the interaction of a pointing finger 14 and a nonpointing finger 14' of an operator with the photosensing assembly 20 which detects the presence or absence of the pointing finger. FIGS. 4, 5 and 6 illustrate respectively top and bottom plan views, and a left elevational view of the hands-free bar code scanner 10. The hands-free scanning unit 10 is mounted on the back of the hand 12 of an operator by the mounting 21 which includes a strap 26 which encircles the wrist or forearm of the operator. Two mounting frames 28, FIGS. 5 and 7, are provided, one on each side of the underneath of a housing 30 to secure the mounting to the housing 30 for the unit, and the mounting encircles the wrist and/or forearm of the operator.

The hands-free scanning unit housing 30 is suitably sized to mount on the back of the hand of an operator. The housing 30 includes first and second bottom indentations 32, 34 for receiving the index and middle fingers of the operator. Each indentation has a photosensor assembly 20 associated therewith which points in a direction 39 toward either an extended finger, as illustrated in FIG. 2.

A preferred method of detecting positional movements of a finger is with an active sensing assembly 20 comprising both a light-emitting device 38 (e.g. an infrared (IR) LED) and a light-detecting device 40 (e.g. an IR photodetector). One sensing assembly 20 comprising a pair of light-emitting and light-detecting devices is mounted and appropriately aligned above the operator's index finger, and a second sensing assembly 20 is positioned above the middle finger.

The sensing assemblies 20 are aimed such that light is emitted by the light-emitting device 38 along direction 39, in a triangulation configuration towards the finger, as illustrated in FIGS. 3 and 5. In the triangular configuration, the centerline 39 of the beam of the light-emitting device 38 is pointed towards the centerline 41 of the light-detecting device 40, and the centerline of the light-detecting device 40 is pointed towards the centerline 39 of the light-emitting device 38, with the centerlines 39, 41 of the devices 38 and 40 intersecting at a point approximately ⅛ inch from the devices 38 and 40. When a finger is in a relaxed and nonpointing position as finger 14' in FIG. 3, then light in the light beam is reflected by the finger back to the photodetector 40 in a light state, whereas when a finger is in a pointed extended position as finger 14 in FIG. 3, then the finger blocks and intercepts the light beam, and the photodetector 40 is in a dark state. Accordingly, a light state is established when the operator's finger is relaxed and nonpointing (retracted away from the sensing assembly as shown by finger 14', FIG. 3). A dark state is established when a finger is raised and extended, as in pointing finger 14, FIG. 3, to come up against the sensing assembly and block the light beam.

Figure 8A:
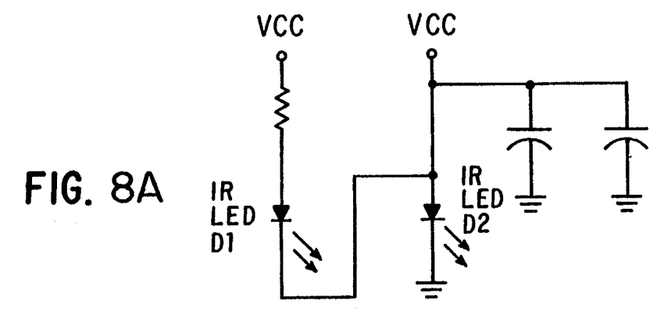
FIGS. 8A, 8B and 8C depict an exemplary logic circuit for processing, and optionally filtering, the outputs of the two sensor assemblies for the index and middle fingers, to provide for ambidextrous operation of the bar code scanner unit.
Figure 8B:
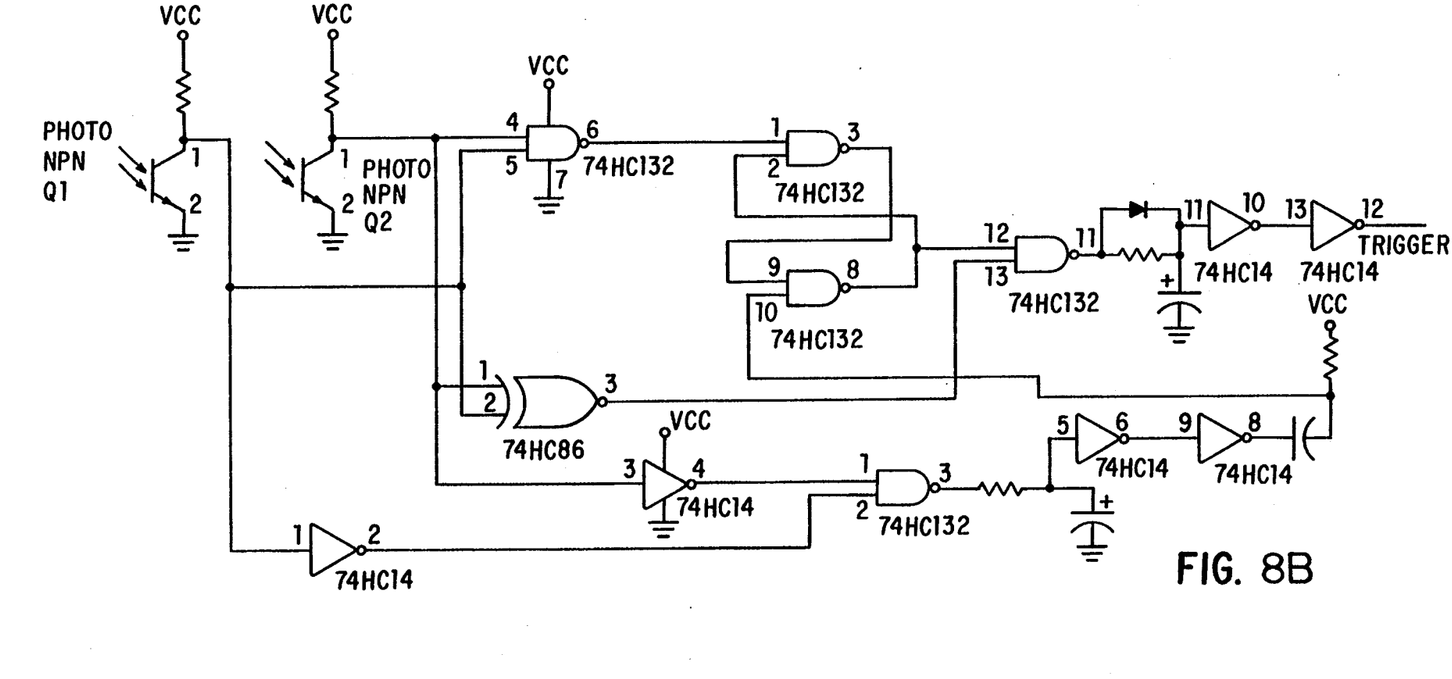

Logic is provided such that triggering of the scanner occurs only when, after both sensing pairs have been in the light state, then only one of the two sensing pairs goes to the dark state. The scanner does not trigger with both fingers up, or with both fingers down. It triggers after both fingers are down, followed by one finger up and one finger down. This required sequence of positional moves follows from a natural pointing movement, and prevents false triggering while the operator's fingers are moving around such as in performing other normal tasks. A sensing/triggering logic circuit as shown in FIGS. 8A and 8B analyzes the sequential outputs of the two photosensor assemblies 20, and also incorporates time delays and pulsing to optimize performance and reduce power consumption.

Figure 8C:
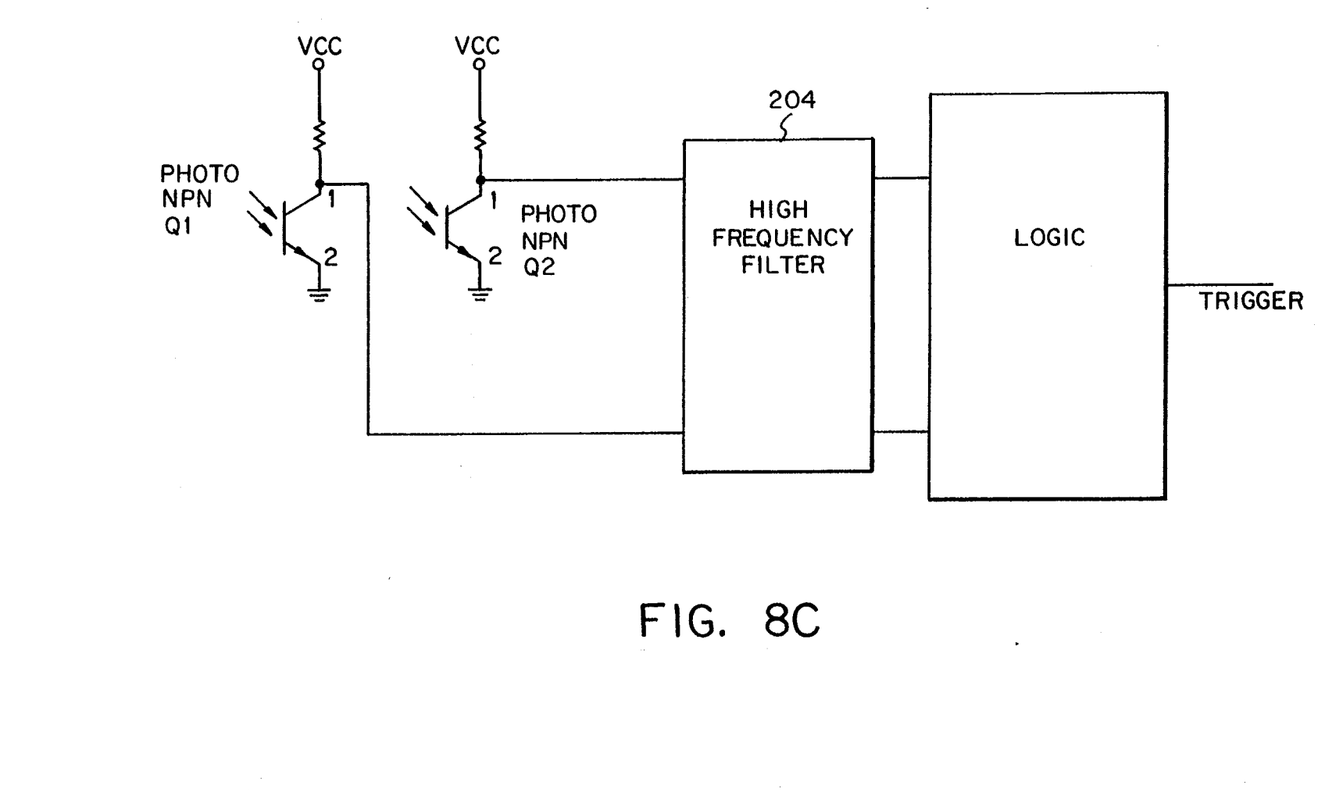
Figure 10:
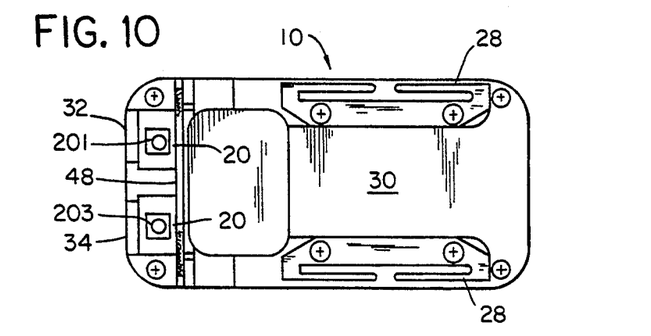
FIG. 10 is a bottom plan view of the hands-free bar code scanner unit of FIGS. 1–4 and 6 illustrating an alternative embodiment, to that of FIG. 5, utilizing passive photo detection.

In an alternative embodiment, the photosensor assembly might be passive and include only a photodetector for detecting ambient room illumination as shown in FIG. 10. During operation of this alternative embodiment, when the index and/or second finger of the operator is extended to point towards a bar code symbol to be scanned, the extended finger blocks the access of the photosensor 201 and 203 to ambient room illumination, and the decrease in detected radiation is detected to trigger operation of the bar code scanner. In this alternative embodiment, the output of the photosensor could be directed through a high frequency filter 204 of FIG. 8C between the photosensors and logic of the exemplary logic circuit of FIG. 8B, such that slow changes in the ambient room illumination would not trigger operation of the bar code scanner, while rapid changes in the illumination level, as caused by an extension of a pointing finger, would trigger operation of the scanner.

A bar code scanner 18, as is known in the art, is mounted in the housing 30, and points along the direction of arrow 42, such that it is aimed in the direction of the pointing index finger 14.

The bar code scanner is preferably a laser scanning device which can be a design of existing available technology, or can be designs being developed that will reduce the size, weight and/or cost of such devices, and specifically can comprise a compact bar code scanner as disclosed in parent patent application Ser. No. 669,417, filed May 13, 1991.

The mounting 21 positions the functional elements of the hands-free scanner such that the inside and bottom of the arm, wrist and hand of an operator are not encumbered thereby. Preferably, one ambidextrous unit, operating in an ambidextrous manner as described above, can be mounted to either the right or left hand/wrist of an operator such that unique right and left handed versions are not required. The mounting positions and holds the scanner assembly in a manner that does not noticeably impair the full and normal functionality of the operator, i.e. does not impair functions of the operator's hand for typical manual tasks such as grabbing and holding objects of various sizes, or performing more dexterous tasks such as operating machinery or signing one's name. It also provides for the unencumbered use of the operator's arms for larger tasks like lifting and carrying boxes.

The mounting includes a section 44 which encircles the wrist and forearm of an operator, and a forwardly extending section 46 which extends forwardly and slides into and secures to the mounting frames 28 on the housing 30. The mounting sections 44 and 46 are preferably designed to be comfortable to wear, and are preferably fabricated from materials commonly available and widely used in skin contact applications, such as a sponge-like material (like foamed neoprene) laminated with various fabric liners (like nylon, polyester, terry cloth, etc.). The sponge-like material provides padding for comfortable use, and the lining provides durability and compatibility with the user.

The mounting can be easily attached or detached from the functional elements, and does not require special instructions or the use of tools. In a preferred embodiment, the mounting 21 also includes an elastic strap 48 that is looped around the index and middle fingers. The main portion of the mounting is secured to the operator's wrist or forearm with an integral strap using a Velcro or other similar means of attachment 51. The mounting covers the back of the hand and preferably extends part way up the forearm to provide stability, and functions as a base for mounting the scanner as well as providing padding between the scanner and the operator's hand and arm.

FIG. 7 illustrates an exploded assembly drawing of one designed embodiment of the housing and bar code scanner. The housing 30 includes a top housing portion 50 having a slanted window 52 near its forward end to allow a scanning beam and reflected radiation from a bar code symbol to pass therethrough. A bottom housing portion 54 has two mounting brackets 28 secured thereto which engage the forward portion 46 of the mounting. The elastic strap 48 which encircles the index and middle fingers of an operator extends downwardly from and connects to the bottom housing portion in a manner as shown generally in FIGS. 1, 2, 3 and 5. The bar code scanner module 18 is positioned beneath the top housing portion 50, and includes a radiation source directing a radiation beam 58 onto a scanning mirror 60 driven by a scanning motor 62. A circuit board 64 is positioned beneath the scanner module 18 and includes thereon the logic circuit to trigger a scanning operation, and other electronics for the unit. All of these components perform in a manner as described hereinabove to trigger and perform a bar code scanning operation, all as generally known in the art.

Figure 12:
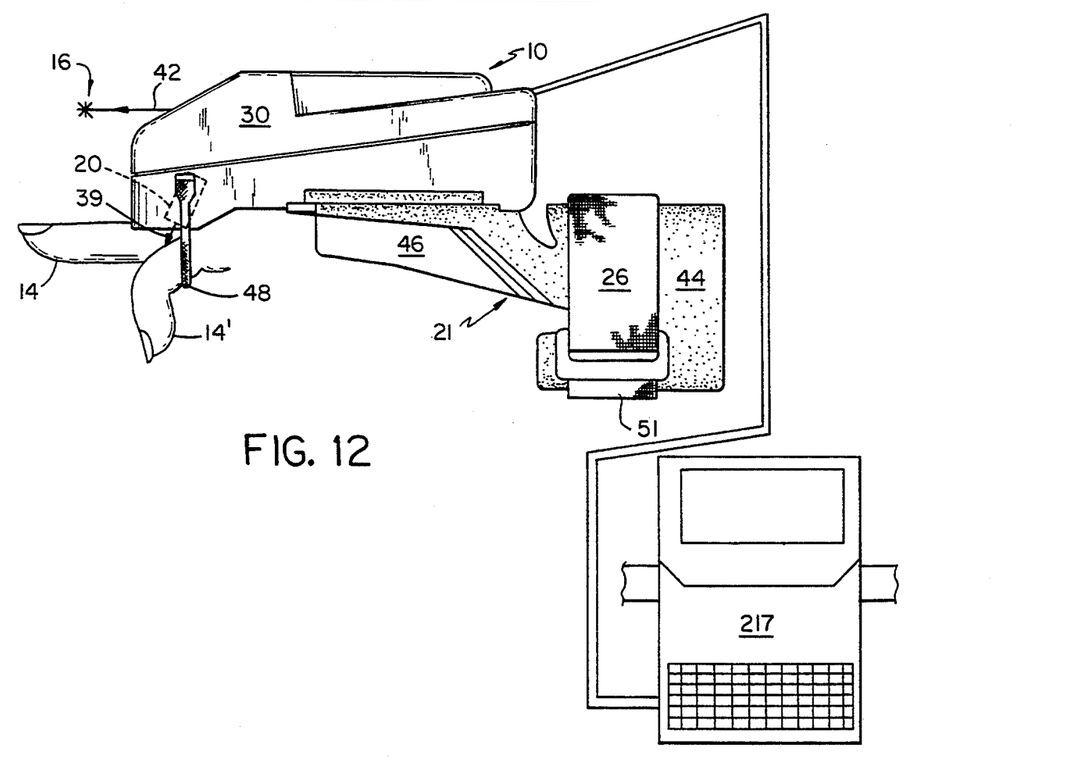
FIG. 12 illustrates a side perspective view of the hands-free bar code scanner unit of FIGS. 1, 2 and 3 with a connection to a small computer unit.

The hands-off bar code scanner unit 10 of the present invention can as shown in FIG. 12 be connected to a small computer unit 217 carried on the belt of the operator, which in turn communicates, as with an RF communication link, with a nearby host computer.

Figure 9:
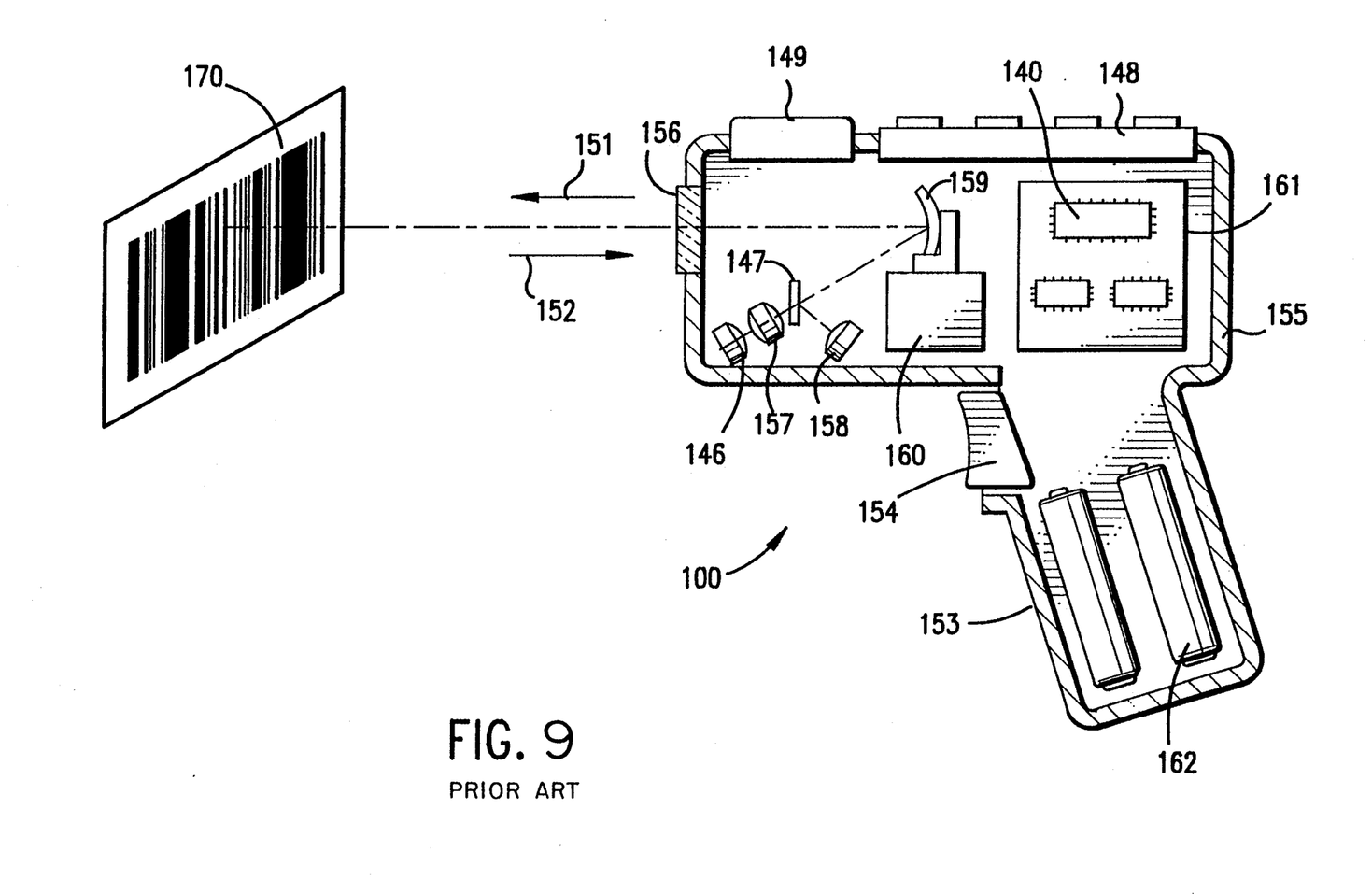
FIG. 9 illustrates a highly simplified embodiment of one type of prior art bar code reader which illustrates and explains the essential components thereof.

FIG. 9 illustrates a highly simplified embodiment of one type of prior art bar code reader and illustrates the essential components thereof. The reader 100 is illustrated as being implemented in a hand-held scanner, but could also be utilized in other arrangements, as herein. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 9 is generally of the style disclosed in U.S. Pat. No. 4,760,248 issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al. or U.S. Pat. No. 4,409,470 issued to Shepard et al., both such patents assigned to Symbol Technologies, Inc., may be employed in constructing the bar code reader unit of FIG. 9. These U.S. Pat. Nos. 4,760,248, 4,896,026 and 4,409,470 are incorporated herein by reference, but the general design of such devices will be briefly described here for reference.

Referring to FIG. 9 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device having a pistol-grip type of handle 153. A movable trigger 154 is employed to allow the user to activate the light beam 151 and detector circuitry when the user has positioned the device to point at the symbol to be read. A lightweight plastic housing 155 contains the laser light source 146, the detector 158, the optics 157, 147, 159, and signal processing circuitry including a CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 9, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser-/optics subassembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of a data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

Figure 11:
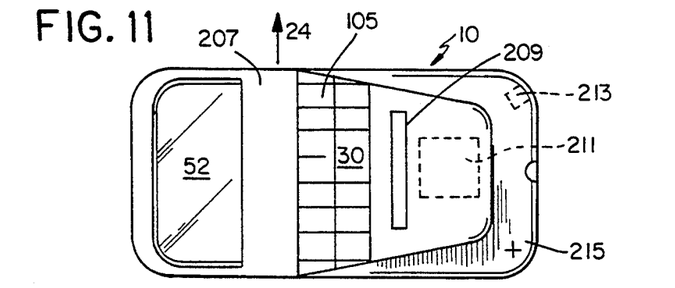
FIG. 11 illustrates a top plan view of the hands-free bar code scanner unit of FIGS. 1–3 with additional features.

The scanning module described above may also be implemented within a self-contained data acquisition system, as shown in FIG. 11, including one or more such components as keyboard 205, display 207, printer 209, data storage 211, application software, and data bases. Such a system may also include a communications interface to permit the data acquisition system to communicate with other components of a local area network or with the telephone exchange network, either through a modem or an ISDN interface 213, or by low power radio broadcast from the portable terminal to a stationary receiver via transmitter 215.

While several embodiments and variations of the present invention for a hands-free bar code scanner are described in detail herein, it should be apparent that the disclosure and teachings of the present invention will suggest many alternative designs to those skilled in the art.

What is claimed is:

1. A hands-free bar code scanner unit, comprising:
   a. a photosensor means for detecting a predetermined positional movement of one or more fingers by an operator, wherein said photosensor means comprises an active photosensor assembly which includes means for generating a radiation beam which can be interrupted by a moving finger, and a photodetector means for detecting reflected radiation of the radiation beam;
   b. a bar code scanner arranged to scan in a direction in which the scanner is aimed; and
   c. means responsive to said photosensor means detecting a predetermined positional movement of one or more fingers to actuate the bar code scanner.

2. A hands-free bar code scanner unit, comprising:
   a. a photosensor means for detecting a predetermined positional movement of one or more fingers by an operator, wherein said photosensor means comprises a passive photodetector means for detecting ambient room illumination which is blocked by a pointing finger and passed to the photodetector means by a nonpointing finger;
   b. a bar code scanner arranged to scan in a direction in which the scanner is aimed; and
   c. means responsive to said photosensor means detecting a predetermined positional movement of one or more fingers to actuate the bar code scanner.

3. A hands-free bar code scanner unit as claimed in claim 1 or 2, wherein said photosensor means detects a pointing position of the index finger, and wherein the bar code scanner is aimed in the direction of the pointing position of the index finger.

4. A hands-free bar code scanner unit as claimed in claim 3, wherein said photosensor means also detects a relaxed nonpointing position of the middle finger.

5. A hands-free bar code scanner unit as claimed in claim 4, wherein said photosensor means first detects relaxed nonpointing positions of both the index finger and the middle finger, followed by a pointing position of the index finger and a relaxed nonpointing position of the middle finger.

6. A hands-free bar code scanner unit as claimed in claim 5, wherein the photosensor is mounted in a housing which is contoured with recesses to fit the back of the index finger and the back of the middle finger of the operator.

7. A hands-free bar code scanner unit as claimed in claim 6, further comprising a keyboard and display mounted in said housing.

8. A hands-free bar code scanner unit as claimed in claim 7, further comprising a printer and data storage device mounted in said housing.

9. A hands-free bar code scanner unit as claimed in claim 6, further comprising a communications interface means mounted in said housing for providing a communication link between said scanner unit and a local area network or telephone exchange network.

10. A hands-free bar code scanner unit as claimed in claim 6, further comprising a low power radio broadcast transmission means mounted in said housing for providing a communications link between said scanner unit and a stationary receiver.

11. A hands-free bar code scanner unit as claimed in claim 5, wherein a logic circuit is coupled to said photosensor means to actuate the bar code scanner when the outputs of said photosensor means indicate first detecting relaxed nonpointing positions of both the index finger and the middle finger, followed by a pointing position of the index finger and a relaxed nonpointing position of the middle finger, thereby providing for ambidextrous placement of the unit on either the right hand or the left hand of the operator.

12. A hands-free bar code scanner unit as claimed in claim 1 or 2, wherein said photosensor is mounted in a housing which is contoured to fit the back of the hand and is also contoured with at least one recess to fit the top of at least one moving finger of the operator.

13. A hands-free bar code scanner unit as claimed in claim 12, wherein said housing is contoured with recesses to fit the tops of the index and middle fingers of an operator, and a photosensor means is provided for each of the index and middle fingers of the operator.

14. A hands-free bar code scanner unit as claimed in claim 1 or 2, further including a mounting for securing said scanner and photosensor means to the wrist or forearm of the operator, with a rear portion of the mounting being wrapped around the wrist or forearm of the operator, and a forward portion of the mounting being secured to mounting frames underneath said housing, and wherein said rear portion of the mounting includes a strap which encircles the wrist or forearm of the operator.

15. A hands-free bar code scanner unit as claimed in claim 14, wherein said strap includes a Velcro release.

16. A hands-free bar code scanner unit as claimed in claim 14, wherein said mounting further includes an elastic band which encircles both the index and middle fingers of the hand of the operator.

17. A hands-free bar code scanner unit as claimed in claim 1 or 2, wherein the bar code scanner unit is capable of ambidextrous operation and can fit either the left or right hand of the operator, and logic is provided to enable the bar code scanner upon the pointing of the index finger of either the left or right hand of the operator on which the scanner is mounted and the simultaneous relaxed nonpointing of the middle finger of either the left or right hand of the operator on which the scanner is mounted.

18. A hands-free bar code scanner unit as claimed in claim 1 or 2, further comprising a small computer unit capable of being mounted on a belt worn by the operator and communicating with said scanner unit.

19. A hands-free bar code scanner unit as claimed in claim 18, wherein said computer unit has a radio frequency communications means capable of establishing a communications link with a host computer.

20. A hands-free bar code scanner unit as claimed in claim 2, wherein said photodetector means generates an output and said photosensor means further comprises a high frequency filtering means for filtering the photodetector output such that slow changes in ambient illumination do not actuate the bar code scanner.

21. A method of operating a hands-free bar code scanner unit, comprising the steps of:
   a. aiming the bar code scanner at a bar code symbol to be detected;

b. photodetecting positional movement of one or more fingers of an operator, wherein said photodetecting is performed by generating a radiation beam which can be interrupted by a moving finger, and detecting reflected radiation of the radiation beam; and c. actuating the bar code scanner responsive to the photodetecting of a predetermined positional movement of said one or more fingers of the operator.

22. A method of operating a hands-free bar code scanner unit, comprising the steps of:

a. aiming the bar code scanner at a bar code symbol to be detected;

b. photodetecting positional movement of one or more fingers of an operator, wherein said photodetecting is performed by photodetecting ambient room illumination which is not blocked by a pointing finger; and c. actuating the bar code scanner responsive to the photodetecting of a predetermined positional movement of said one or more fingers of the operator.

23. A method of operating a hands-free bar code scanner unit as claimed in claim 21 or 22, wherein said photodetecting step comprises detecting a pointing position of an index finger of the operator, and aiming the scanner in the direction of the pointing position of an index finger.

24. A method of operating a hands-free bar code scanner unit as claimed in claim 23, wherein said photodetecting step further comprises photodetecting a relaxed nonpointing position of a middle finger of the operator.

25. A method of operating a hands-free bar code scanner unit as claimed in 24, wherein said photodetecting step further comprises first photodetecting relaxed nonpointing positions of both the index finger and the middle finger, followed by photodetecting a pointing position of the index finger and a relaxed nonpointing position of the middle finger.

26. A method of operating a hands-free bar code scanner unit as claimed in claim 25, wherein said actuating of the bar code scanner occurs upon sequentially first photodetecting relaxed nonpointing positions of both the index finger and the middle finger, followed by detecting a pointing position of the index finger and a relaxed nonpointing position of the middle finger, and said actuating is performed using logic circuitry which allows ambidextrous placement of the unit on either the right hand or the left hand of an operator.

27. A method of operating a hands-free bar code scanner unit as claimed in claim 21, wherein the operation of the bar code scanner unit is ambidextrous and can be performed by either a left or right hand of the operator, and said actuating of the bar code scanner occurs upon the photodetecting of a pointing of an index finger of either the left or right hand of the operator on which a photosensor is mounted and a simultaneous relaxed nonpointing of a middle finger of either the left or right hand of the operator on which the photosensor is mounted.

28. A method of operating a hands-free bar code scanner unit as claimed in claim 21 or 22, further comprising the step of establishing a communications link between said scanner unit and a local area or telephone exchange network.

29. A method of operating a hands-free bar code scanner unit as claimed in claim 21 or 22, further comprising the step of establishing a low power radio broadcast communications link between said scanner unit and a stationary receiver.

30. A method of operating a hands-free bar code scanner unit as claimed in claim 21, further comprising the step of establishing a communication link between said scanner unit and a small computer unit capable of being mounted to a belt worn by the operator.

31. A method of operating a hands-free bar code scanner unit as claimed in claim 22, wherein said photodetecting step includes generating an output signal and subjecting said signal to high-frequency filtering such that slow changes in the ambient room illumination do not activate the bar code scanner.

32. A hands-free bar code scanner unit mounted on the hand or wrist of an operator which is actuated by a predetermined positional movement of one or more fingers by the operator while aiming the scanner at a bar code symbol to be detected, comprising:

a. a housing to be mounted on the back of the hand or wrist of an operator;

b. activation switch means of a photosensor type, mounted in said housing, responsive to a predetermined movement of one or more fingers by the operator, wherein said switch means comprises an active photosensor assembly which includes means for generating a radiation beam which can be interrupted by a moving finger, and a photodetector means for detecting reflected radiation of the radiation beam;

c. a bar code scanner, mounted in said housing to scan in a direction in the general direction of the outstretched finger of the operator, and being responsive to said activation switch means to actuate scanning by the bar code scanner.

33. A hands-free bar code scanner unit mounted on the hand or wrist of an operator which is actuated by a predetermined positional movement of one or more fingers by the operator while aiming the scanner at a bar code symbol to be detected, comprising:

a. a housing to be mounted on the back of the hand or wrist of an operator;

b. activation switch means of a photosensor type, mounted in said housing, responsive to a predetermined movement of one or more fingers by the operator, wherein said switch means comprises a passive photodetector means for detecting ambient room illumination which is blocked by a pointing finger and passed to the photodetector means by a nonpointing finger;

c. a bar code scanner, mounted in said housing to scan in a direction in the general direction of the outstretched finger of the operator, and being responsive to said activation switch means to actuate scanning by the bar code scanner.

34. A hands-free bar code scanner unit as claimed in claim 32 or 33, wherein said activation switch means detects a pointing position of the index finger, and wherein the bar code scanner is mounted in said hosing such that the emitted light beam is generally directed in the direction of the pointing position of the index finger.

35. In a bar code scanner adapted to be mounted on the hand or wrist of the user and provided with a triggering arrangement to actuate the scanner for reading a bar code, the improvement which comprises the triggering arrangement including a photosensor means for detecting a predetermined position movement of the user, and for actuating the scanner to read a bar code upon such detection, wherein said photosensor means comprises an active photosensor assembly which includes means for generating a radiation beam which can be interrupted by a moving finger, and a photodetector means for detecting reflected radiation of the radiation beam.

36. In a bar code scanner adapted to be mounted on the hand or wrist of the user and provided with a triggering arrangement to actuate the scanner for reading a bar code, the improvement which comprises the triggering arrangement including a photosensor means for detecting a predetermined position movement of the user, and for actuating the scanner to read a bar code upon such detection, wherein said photosensor means comprises a passive photodetector means for detecting ambient room illumination which is blocked by a pointing finger and passed to the photodetector means by a nonpointing finger.

37. Improvement according to claim 35 or 36 in which said predetermined position movement comprises a movement of solely pointing the index finger from a position of the hand in which the index finger is not so solely pointed.

38. Improvement according to claim 35 or 36 in which the scanner is constructed so that, when mounted on the hand or wrist of the user, it will be aimed in the direction that the user's index finger points.

* * * * *